United States Patent
Alexandersson et al.

(10) Patent No.: US 10,562,427 B2
(45) Date of Patent: Feb. 18, 2020

(54) VEHICLE SEAT AND HEAD REST FOR A VEHICLE SEAT

(71) Applicant: Volvo Car Corporation, Gothenburg (SE)

(72) Inventors: Peter Alexandersson, Kungsbacka (SE); Louise Temin, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 73 days.

(21) Appl. No.: 15/708,470

(22) Filed: Sep. 19, 2017

(65) Prior Publication Data
US 2018/0111523 A1 Apr. 26, 2018

(30) Foreign Application Priority Data

Oct. 26, 2016 (EP) ..................................... 16195804

(51) Int. Cl.
*A47C 1/10* (2006.01)
*B60N 2/888* (2018.01)
*B60N 2/815* (2018.01)
*B60N 2/829* (2018.01)
*B60N 2/865* (2018.01)
*B60N 2/868* (2018.01)
B60N 2/894 (2018.01)

(52) U.S. Cl.
CPC ............ *B60N 2/888* (2018.02); *B60N 2/815* (2018.02); *B60N 2/829* (2018.02); *B60N 2/865* (2018.02); *B60N 2/868* (2018.02); *B60N 2/894* (2018.02)

(58) Field of Classification Search
CPC ........ B60N 2/2851; B60N 2/818; B60N 2/80; B60N 2/809; B60N 2/865; B60N 2/829
USPC .................................................. 297/406–410
See application file for complete search history.

(56) References Cited

U.S. PATENT DOCUMENTS 3,563,602 A * 2/1971 Ohta ....................... B60N 2/818
297/410
4,304,439 A * 12/1981 Terada ..................... A47C 7/38
297/409
7,137,668 B2 * 11/2006 Kreitler .................. B60N 2/818
297/410

(Continued)

FOREIGN PATENT DOCUMENTS

CN 104442481 A 3/2015
CN 105835737 A 8/2016

(Continued)

*Primary Examiner* — Shin H Kim
(74) *Attorney, Agent, or Firm* — Snyder, Clark, Lesch & Chung, LLP

(57) ABSTRACT

The present invention relates to a head rest arrangement for a vehicle seat and a vehicle seat comprising such head rest. The head rest arrangement comprises a cushion portion and a back portion. The head rest arrangement further comprises a displacement arrangement enabling at least the cushion portion to be displaced between at least a first position and a second position with respect to the vehicle seat after being mounted thereto. The displacement arrangement comprising a lock mechanism adapted to lock the cushion portion in the first position and the second position. The displacement arrangement comprises an actuator operable by a user to unlock the lock mechanism. The actuator is made from a compliant material and actuated via a pulling force in a first direction.

15 Claims, 6 Drawing Sheets

(56) References Cited

U.S. PATENT DOCUMENTS

| | | | | |
|---|---|---|---|---|
| 7,306,287 B2* | 12/2007 | Linardi | ............... | B60N 2/821 |
| | | | | 297/410 |
| 7,316,455 B2* | 1/2008 | Metz | ............... | B60N 2/815 |
| | | | | 297/410 |
| 7,322,646 B2 | 1/2008 | Jammalamadaka et al. | | |
| 7,562,936 B1* | 7/2009 | Veine | ............... | B60N 2/815 |
| | | | | 297/410 |
| 7,717,507 B2* | 5/2010 | Toda | ............... | B60N 2/862 |
| | | | | 297/216.12 |
| 7,770,967 B2* | 8/2010 | Hirota | ............... | B60N 2/002 |
| | | | | 297/216.12 |
| 7,871,129 B2* | 1/2011 | Boes | ............... | B60N 2/815 |
| | | | | 297/404 |
| 8,297,705 B2* | 10/2012 | Brunner | ............... | B60N 2/815 |
| | | | | 297/410 |
| 8,408,644 B2* | 4/2013 | Froese | ............... | B60N 2/865 |
| | | | | 297/216.12 |
| 8,517,471 B2* | 8/2013 | Maddelein | ............... | B60N 2/865 |
| | | | | 297/410 |
| 8,573,703 B2* | 11/2013 | Poehlmann | ............... | B60N 2/815 |
| | | | | 297/410 |
| 8,746,799 B2 | 6/2014 | Dumont | | |
| 8,814,265 B2* | 8/2014 | Froese | ............... | B60N 2/865 |
| | | | | 297/216.12 |
| 9,446,695 B2* | 9/2016 | Ishihara | ............... | B60N 2/4228 |
| 2003/0057748 A1* | 3/2003 | Schafer | ............... | B60N 2/427 |
| | | | | 297/216.12 |
| 2004/0262974 A1* | 12/2004 | Terada | ............... | B60N 2/865 |
| | | | | 297/407 |
| 2005/0280304 A1* | 12/2005 | Akaike | ............... | B60N 2/0232 |
| | | | | 297/391 |
| 2006/0119150 A1* | 6/2006 | Hoffmann | ............... | B60N 2/865 |
| | | | | 297/216.12 |
| 2006/0175881 A1* | 8/2006 | Akaike | ............... | B60N 2/821 |
| | | | | 297/216.12 |
| 2007/0096515 A1 | 3/2007 | Jammalamadaka et al. | | |
| 2007/0145804 A1* | 6/2007 | Ichisugi | ............... | B60N 2/818 |
| | | | | 297/410 |
| 2007/0241593 A1* | 10/2007 | Woerner | ............... | B60N 2/865 |
| | | | | 297/216.12 |
| 2007/0246989 A1* | 10/2007 | Brockman | ............... | B60N 2/865 |
| | | | | 297/391 |
| 2009/0179474 A1* | 7/2009 | Reel | ............... | B60N 2/815 |
| | | | | 297/391 |
| 2010/0001561 A1* | 1/2010 | Otsuka | ............... | B60N 2/42781 |
| | | | | 297/216.12 |
| 2010/0109397 A1* | 5/2010 | Bandurksi | ............... | B60N 2/4279 |
| | | | | 297/216.12 |
| 2011/0109143 A1* | 5/2011 | Maddelein | ............... | B60N 2/865 |
| | | | | 297/404 |
| 2011/0291456 A1* | 12/2011 | Poehlmann | ............... | B60N 2/815 |
| | | | | 297/410 |
| 2012/0126605 A1* | 5/2012 | Gross | ............... | B60N 2/894 |
| | | | | 297/410 |
| 2012/0153699 A1 | 6/2012 | Dumont | | |
| 2013/0320725 A1* | 12/2013 | Conway | ............... | B60N 2/2851 |
| | | | | 297/256.11 |
| 2015/0054327 A1* | 2/2015 | Reinhold | ............... | B60N 2/829 |
| | | | | 297/410 |
| 2015/0251574 A1* | 9/2015 | Ishihara | ............... | B60N 2/862 |
| | | | | 297/391 |
| 2015/0258924 A1* | 9/2015 | Ishihara | ............... | B60N 2/4228 |
| | | | | 297/216.12 |
| 2017/0349070 A1* | 12/2017 | Leise | ............... | B60N 2/809 |
| 2018/0037146 A1* | 2/2018 | Line | ............... | B60N 2/80 |
| 2018/0111523 A1* | 4/2018 | Alexandersson | ...... | B60N 2/829 |
| 2018/0134188 A1* | 5/2018 | Niitsuma | ............... | B60N 2/80 |
| 2018/0222367 A1* | 8/2018 | Ogawa | ............... | B60N 2/853 |

FOREIGN PATENT DOCUMENTS

| | | |
|---|---|---|
| JP | S57125707 A | 8/1982 |
| WO | 2016171138 A1 | 10/2016 |

* cited by examiner

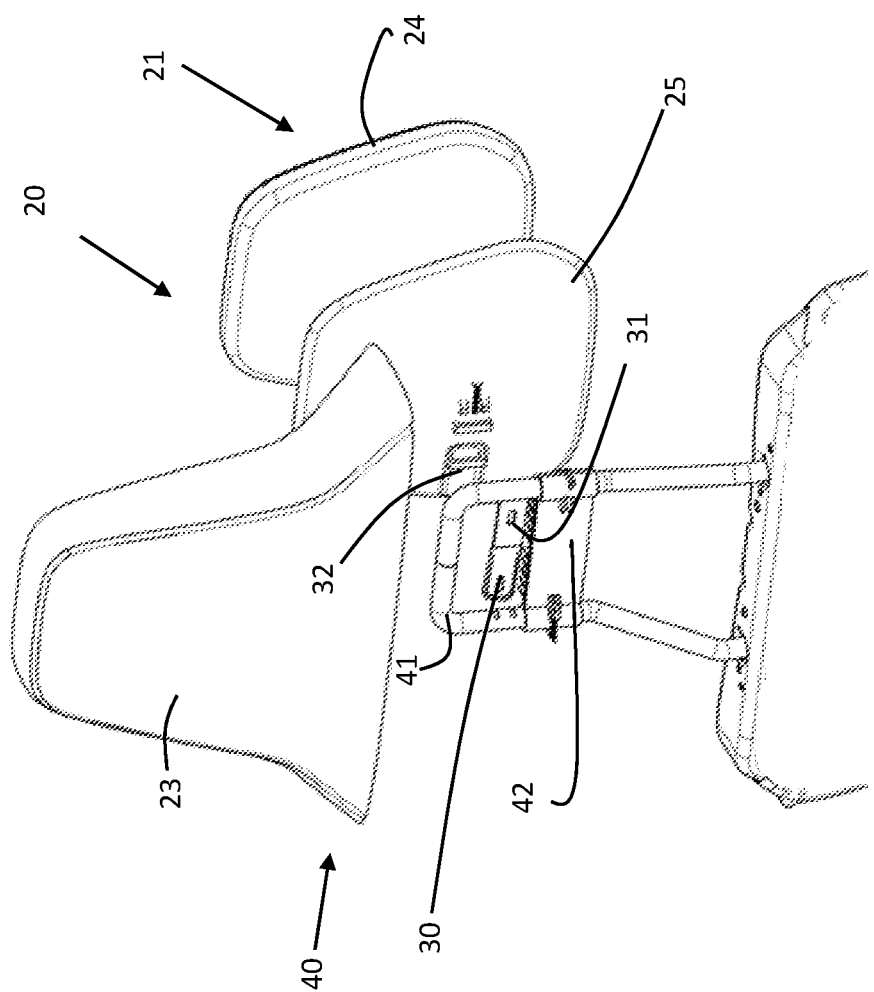

VEHICLE SEAT AND HEAD REST FOR A VEHICLE SEAT

RELATED APPLICATION

This application claims priority under 35 U.S.C. § 119 based on European Patent Application No. 16195804.6, filed Oct. 26, 2016, the disclosure of which is hereby incorporated by reference herein.

TECHNICAL FIELD

The present disclosure relates to a head rest arrangement and a vehicle seat comprising such head rest arrangement. The head rest arrangement comprises a displaceable cushion portion operable via an actuator by a user.

BACKGROUND

Vehicle seats for vehicles have gone through significant improvements during the last decade. Incorporating more safety features and comfort features into vehicle seats generally tend to build the vehicle seat in size. Vehicle manufacturers are however caught between the hammer and the nail as manufacturers' struggle with adding safety features and comfort feature to the vehicle seats; they also strive towards providing more sit space inside the vehicles. Slim vehicle seats are thus becoming more and more important especially for smaller vehicles. When a vehicle collides, such as an automobile colliding with another automobile, the imparted force on the passengers can have terrible consequences in the form of injuries on the passengers. A very unfortunate scenario is when an unbuckled back passenger sitting in a rear seat of the vehicle, is thrown forwards past a front seat of the vehicle, due to the rapid retardation of the vehicle during e.g. a collision.

The European Patent Application No. EP 2,540,565 A1, assigned to Volvo Car Corp. discloses a slim head rest arrangement displaceable in a vertical direction. The head rest arrangement is specifically good for protecting rear passengers. It has recently been found that head rest arrangement such as the aforementioned kind can be improved further. Displacement mechanisms in head rest arrangements generally tend to be space consuming and are even restricted due to regulations in some countries.

There is thus a need to provide improved head rest arrangements that can be incorporated in slim head rest arrangements and provide additional safety for the passengers in the vehicles.

SUMMARY

It is an object of the present disclosure to at least partly solve some of the mentioned drawbacks or at least provide for a useful alternative. One or more of the drawbacks are at least partly solved by a head rest arrangement for a vehicle seat. The head rest arrangement comprises a cushion portion and a back portion. The head rest arrangement further comprises a displacement arrangement enabling at least the cushion portion to be displaced between at least a first and a second position with respect to the vehicle seat after being mounted thereto. The displacement arrangement comprises a lock mechanism adapted to lock the cushion portion in the first and the second position. The displacement arrangement comprises an actuator operable by a user to unlock the lock mechanism. The actuator is at least partly made from a compliant material and is actuated via a pulling force in a first direction.

The head rest arrangement provides an actuator which reduces the risk for injuries during a collision. The head rest arrangement can be made slim as the actuator is operated by use of a pulling force to actuate displacement. Slim head rests provide improved visibility for the driver e.g. when looking towards the passenger seat side of the vehicle and past the passenger vehicle seat. As pulling force is used, the head rest arrangement enables a user to operate both a lock mechanism and displace the cushion portion using only one grip, and without changing grip by operating only the actuator if desirable. It is important for a seat occupant to be able to find a comfortable head rest height preventing from neck injuries in a collision, especially to prevent whiplash injuries if the vehicle is hit from behind. The pulling force may be away from the cushion portion for example.

The actuator can be made to protrude in different directions with respect to the cushion portion such as to the side, up or down or the like, hence the first direction may be lateral, vertical or horizontal etc. In an embodiment, the cushion portion and the back portion may comprise an outer periphery, and the actuator may protrude from the outer periphery of the cushion portion and/or the back portion in the first direction. The head rest arrangement provides for a wide variety of options as to how the actuator extends as the head rest arrangement is operable via a pulling force. In one embodiment the actuator protrudes from the outer periphery of the cushion portion but not past the outer periphery of the back portion.

The actuator may protrude from the outer periphery from a position between the cushion portion and the back portion, or from a position within the cushion portion. By having the actuator protruding from between the cushion portion and the back portion of the head rest arrangement, each component can be made slim and no apertures needs to be formed in the cushion portion or the back portion. By having the actuator sliding in a groove, e.g. in a section of the cushion portion and/or the back portion the head rest arrangement can be made even slimmer.

The head rest arrangement may comprise mechanism to displace the cushion portion in any direction, i.e. along one or more of the X, Y, Z axes. Just as a matter of example, the cushion portion may be displaced in at least a vertical direction and/or a horizontal direction after the lock mechanism has been unlocked via the actuator.

The first direction may be substantially perpendicular to a vertical direction after the head rest arrangement is mounted to the vehicle seat. Optionally the first direction may be substantially parallel to a vertical direction after the head rest arrangement is mounted to the vehicle seat. The flexibility enables the head rest arrangement to be mounted in different vehicles and to different vehicle models. It becomes a very versatile head rest arrangement.

By the term compliant material as used herein is meant that the material should be non-rigid so as to yield if manipulated by a user without effort. It is meant that a user may grip and pull the material but also bend or wrinkle the material without effort, i.e. with normal hand force.

The compliant material may be made from natural rubber, synthetic rubber, natural fibers, synthetic fibers, woven fabric, non-woven fabric, thermoplastic polymers or combinations thereof. The compliant material is preferably selected to have a Young's modulus/density of less than 0.1 GPa, preferably less than 0.08 GPa, more preferably less than 0.07 GPa. This will ensure that the actuator is compliant enough not to cause accidental injuries e.g. during a collision. When selecting the material for the actuator, the material may be selected so that the actuator may protrude from the head rest arrangement or a portion thereof, while being non-rigid so as to be non-obstructive.

The actuator and the material of the actuator may be selected so that a load transfer may occur in the first direction while the load transfer is less in a direction opposite to the first direction, preferably significantly less, optionally at least 50% lower, in the direction opposite to the first direction. This indicates that the actuator readily transfers a pulling force while being reluctant to transfer a pushing force. Hence the actuator may transfer force in the pulling direction while not transfer force in any other direction.

The back portion of the head rest arrangement may be integrally formed with a portion of a back rest. As an option, the back portion and the cushion portion may be integrally formed.

The actuator may further comprise a rigid portion, the rigid portion being arranged inside of the head rest arrangement. The actuator may thus be provided with a rigid portion but which does not extend outside of the cushion portion and the back portion so that it may interfere with a passenger, i.e. outside of an outer periphery of the cushion portion and/or the back portion. This enables the actuator to cooperate with other rigid mechanism elements in an easy manner.

The position of the cushion portion may be retained in different ways. The actuator may be connected to a latch adapted to lock the cushion portion in position for example. This has shown to be a space efficient way of implementing a lock mechanism with the actuator.

If the actuator is provided with a rigid portion, the rigid portion may be connected to the latch. This provides for a wear resistant mechanism.

The actuator may displaced by a translatory motion in the first direction when imparted by the pulling force. This provides for a space efficient mechanism.

The actuator may be elastically extended when imparted by the pulling force. It is possible to have a solution which relies simply on the elasticity of the actuator, having one end fixed and the other end operative for a user. The elasticity of the actuator can thus be used to displace e.g. a latch if such is connected.

The actuator may be biased by a biasing member in a direction opposite to the first direction. This will ensure that when a user releases the actuator, i.e. the pulling force is zero, the actuator returns to its original position. If the biasing member if further connected to a latch, the latch can be made to automatically engage the cooperating lock portion to the latch, e.g. a notch.

The actuator may comprise a grip surface so that a user easily can grip the actuator e.g. between the thumb and a finger. The grip surface may have an area of at least 2 $cm^2$, preferably 2-20 $cm^2$, more preferably 2-10 $cm^2$. This will ensure that a user may easily and comfortably grip the actuator. The visible portion of the actuator, i.e. visible outside of the head rest arrangement, may have a length of 10-100 mm, and optionally a thickness of from 0.2-9 mm, and optionally a width of 1-50 mm.

The actuator may be arranged to move synchronously with the cushion portion when the cushion portion is displaced. Hence when a user displaces the cushion portion e.g. in a vertical direction, the actuator is synchronously displaced with the cushion portion.

According to an aspect, the disclosure also relates to a head rest arrangement comprising an actuator operable by a user to displace a portion of the head rest arrangement, such as a cushion portion, which is made from a compliant material.

According to an aspect, the disclosure also relates to a head rest arrangement comprising an actuator operable by a user to displace a portion of the head rest arrangement, such as a cushion portion, which is actuated via a pulling force in a first direction.

BRIEF DESCRIPTION OF THE DRAWINGS

Non-limiting embodiments of the present invention will be described in greater detail with reference to the accompanying drawings in which:

FIG. 3b shows the head rest arrangement of FIG. 3a with an exploded view and with a view towards the back of the head rest arrangement;

DETAILED DESCRIPTION OF EXEMPLARY EMBODIMENTS

Figure 1:
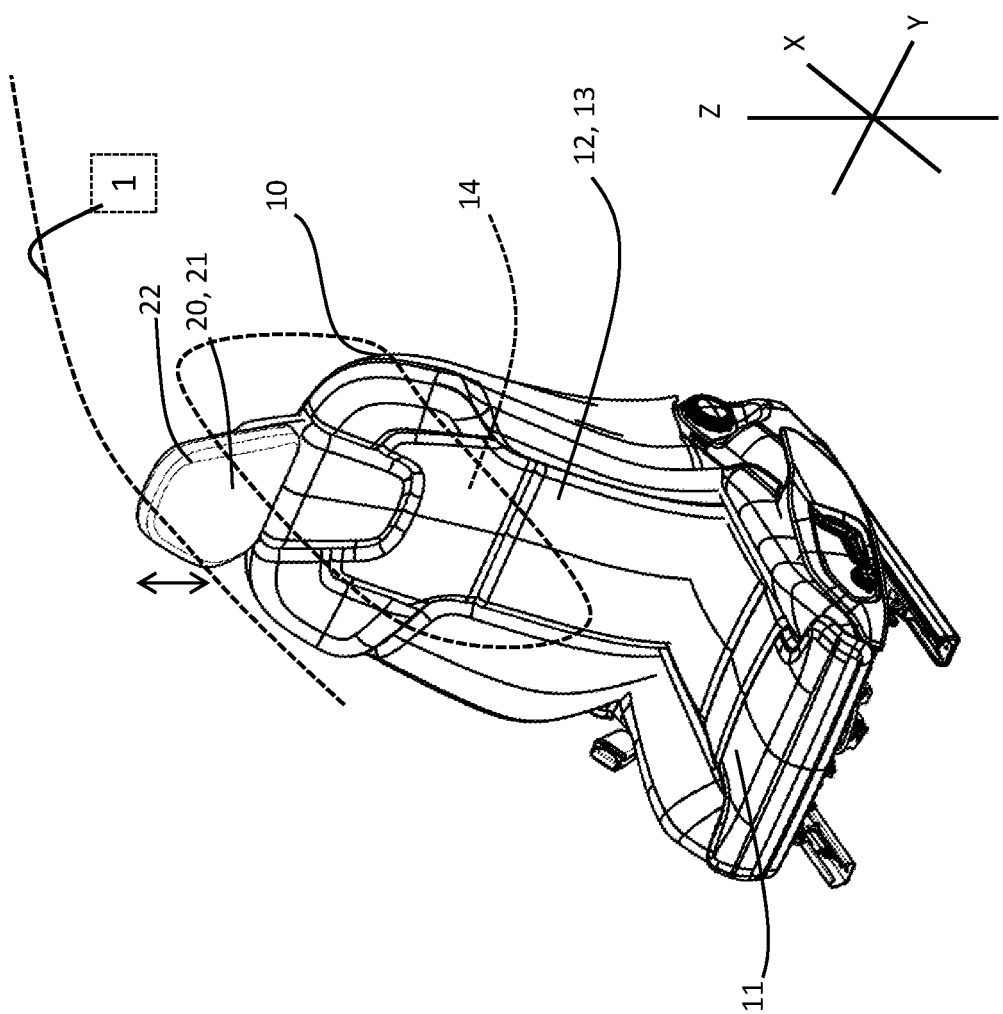
FIG. 1 shows portion of a vehicle comprising at least one vehicle seat comprising a head rest arrangement.

FIG. 1 shows portions of a vehicle 1 comprising at least one vehicle seat 10. For the purpose of orientation the axes X, Y, Z are illustrated in FIG. 1; X axis corresponds to a longitudinal direction of the vehicle 1; Z axis corresponds to the height of the vehicle 1, and; the Y axis corresponds to the width of the vehicle 1. The vehicle 1 is preferably an automobile such as a car. The vehicle seat 10 may be a front or rear vehicle seat for example. The vehicle seat 10 comprises a sit portion 11 and a back rest 12. The back rest 12 has a front side and a back side 13, 14. The vehicle seat 10 may be adjusted to provide a comfortable sit position. Just as a matter of example, the back rest 12 may be adjustable with respect to the sit portion 11 e.g. by being pivotable. The vehicle seat 10 may further be displaceable forward and backwards i.e. along the X axis, and up and down i.e. along the Z axis. The vehicle seat 10 is illustrated in FIG. 1 with trims and cushions.

The vehicle seat 10 comprises a head rest arrangement 20 comprising a cushion portion 21 and a back portion 22 substantially opposite of the cushion portion 21. The cushion portion 21 is displaceable substantially at least along the Z axis so that a passenger may adjust the position of the cushion portion 21 in substantially a vertical direction. The head arrangement 20 may optionally be adjustable in other directions.

Figure 2:
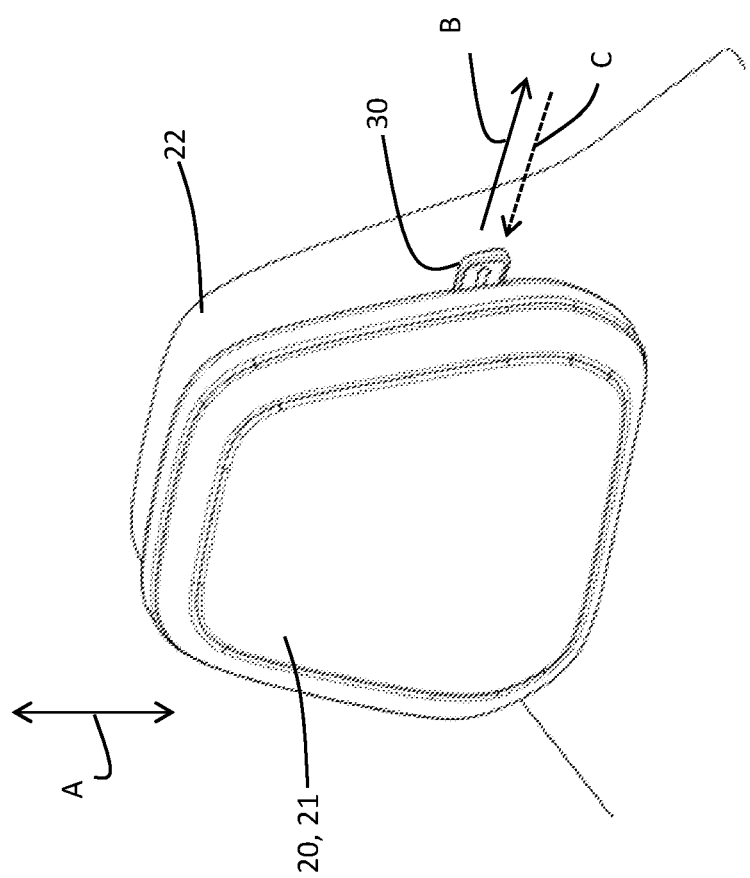
FIG. 2 shows the head rest arrangement in greater detail.

FIG. 2 shows the head rest arrangement 20 according to an embodiment in greater detail. FIG. 2 also shows the cushion portion 21 and the back portion 22. The back portion 22 is in the shown embodiment formed by a portion of a back rest cover to the vehicle seat 10 but could be a separate element. As mentioned above, the cushion portion 21 can be displaced at least in a vertical direction as indicated by the arrow A to provide a comfortable head position for a passenger sitting in the vehicle seat (not shown). The head cushion 21 is displaceable between at least between a first position and a second position e.g. an upper position or a lower position. It should be noted that the cushion portion 21 of course may be positioned in one or more positions between the first position and the second position. The cushion portion 21 may be displaced between the available positions intermittently, i.e. step-wise, or continuously. The head rest arrangement 20 is provided with an actuator 30. A user, e.g. the passenger sitting in the vehicle seat 10 (not shown) may operate the head rest arrangement 20 via the actuator 30.

The actuator 30 is operated by applying a pulling force e.g. as indicated by the arrow B in FIG. 2. Once the actuator 30 has been pulled, the cushion portion 21 may be displaced. The head cushion 21 is displaceable a distance of from 10-100 mm, preferably 10-80 mm, more preferably 10-60 mm, and preferably with respect to the vehicle seat after being mounted thereto. In the shown embodiment, the actuator 21 is biased towards a retracted position. Once a user lets go of the actuator 21, the actuator 21 automatically retracts to the original position by means of the biasing member.

To prevent accidental injuries e.g. during vehicle collisions or the like, the actuator 21 is specifically adapted to be non-obstructive in terms of that it will bend or deform upon being exerted with a push force. This will prevent or at least readily reduce the risk for lacerations due to the projecting actuator 30 in case of a vehicle collision. The actuator 30 may be made from a compliant material such as natural rubber, synthetic rubber, natural fibers, synthetic fibers, woven fabric, non-woven fabric, thermoplastic polymers or combinations thereof. In an embodiment, the actuator 30 or parts of the actuator 30, is elastically extended when imparted by a pulling force. In another embodiment the actuator 30 or parts of the actuator 30, is not elastically extended when imparted by a pulling force.

Figure 3A:
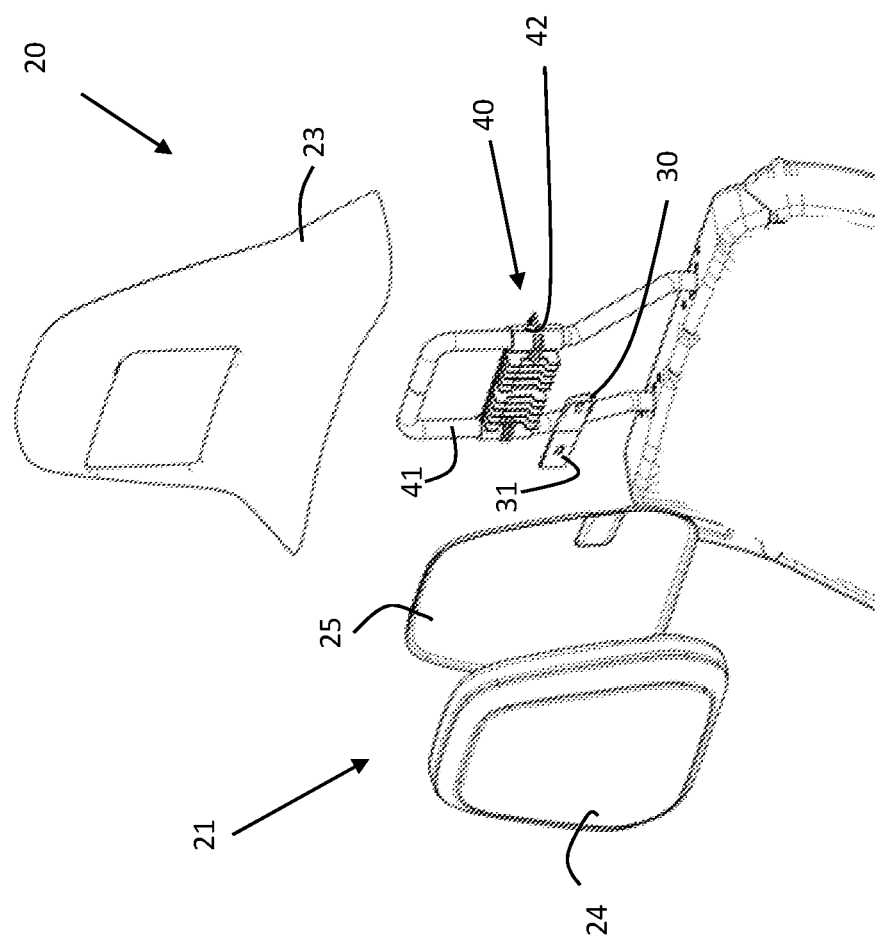
FIG. 3a shows the head rest arrangement of FIG. 2 with an exploded view and with a view towards the front of the head rest arrangement.

The individual components of an embodiment of the head rest arrangement 20 will be described in greater detail with reference to FIGS. 3a-3b. FIGS. 3a-3b show the head rest arrangement 20 with an exploded view and in perspective. FIG. 3a shows the head rest arrangement with a view towards the front and FIG. 3b shows the head rest arrangement 20 with a view towards the back. With reference to both FIGS. 3a-3b, FIGS. 3a-3b show a cushion portion 21 comprising a cushion 24 and a cushion holder 25 and a back rest portion 23. FIG. 3a-3b also shows the actuator 30 and a displacement arrangement 40. The displacement arrangement 40 comprises u-shaped frame 41 on which the cushion portion 21 is displaceably arranged via a connection member 42 extending between the legs of the U-shaped frame 41. The cushion portion 21 is fixedly connected to the connection member 42 which is adapted to slide along the legs of the u-shaped frame 41. The u-shaped frame 41 is in turn fixedly connected to the back rest of the vehicle seat. It should be noted that the u-shaped frame may be pivotally connected to the back rest of the vehicle seat. The cushion portion 21 of the head rest arrangement 20 may thus be adjustable not only in the vertical direction but also in other directions e.g. via the u-shaped frame 41. FIG. 3b also shows a groove 32 in which the actuator 30 may slide. The groove 32 provides for a smooth interface between the cushion portion 21 and the back portion 22.

Figure 4B:
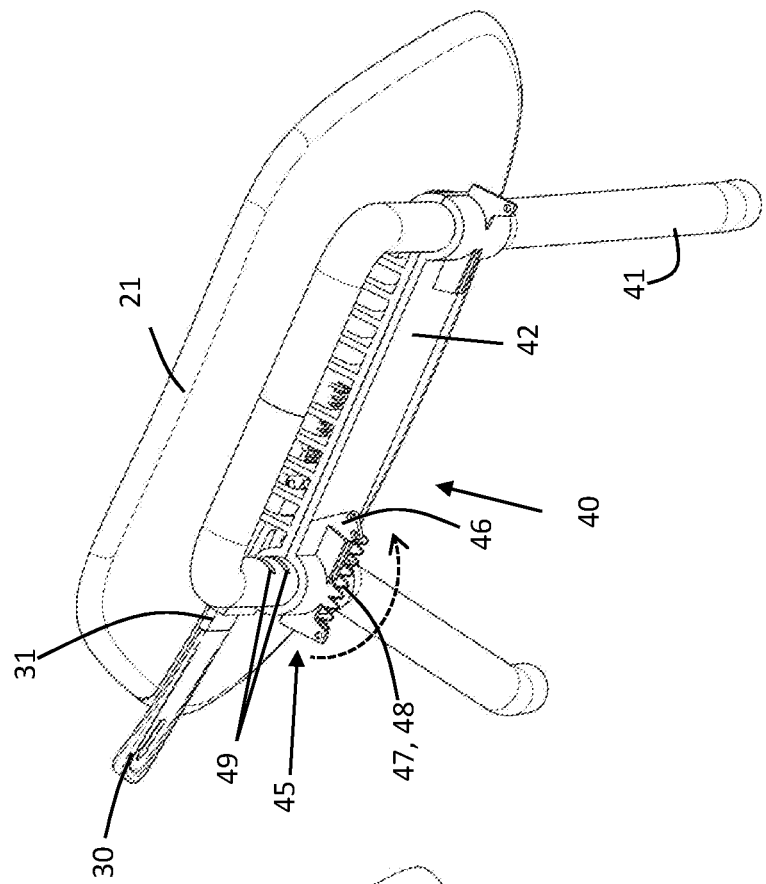
FIG. 4b shows the cushion portion in an unlocked position.
Figure 4A:
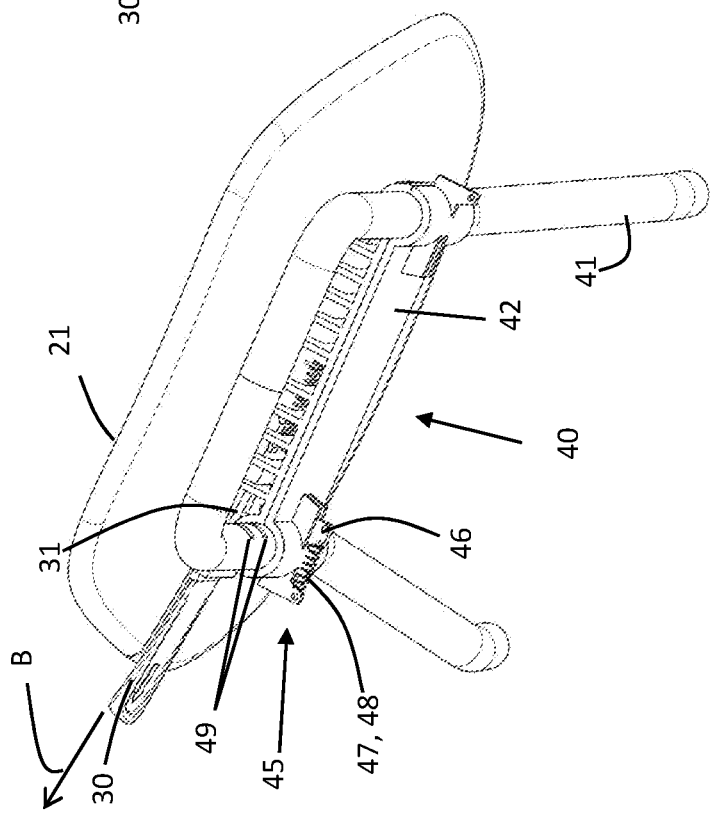
FIG. 4a shows the cushion portion in an locked position.

FIGS. 4a-4b shows the displacement arrangement 40 in greater detail. The displacement arrangement 40 comprises a lock mechanism 45 which is adapted to lock the cushion portion 21 in at least the first position and the second position. The lock mechanism 45 comprises a latch 46 biased via a biasing member 47, in this case a spring 48, connected to the connection member 42. The latch 46 is pivotally arranged to the connection member 42 enabling the latch 46 to be pivoted between a locked position and an unlocked position. The latch 46 is further operatively connected with the actuator 30.

The actuator 30 extends in a substantially perpendicular direction with respect to the legs of the u-shaped frame 41. The actuator 30 may however extend in other directions such as up, down, right, left or any direction there between such as in a diagonal direction. As can be noticed, the cushion portion 21 defines an outer periphery (also clearly noticeable in FIG. 2). The actuator 30 extends past the outer periphery of the cushion portion 21 enabling a user to easily grasp the actuator 30 during use. The compliant material of the actuator 30, which extends outside of the periphery of the cushion portion 21, prevents passengers from accidentally being injured on the actuator 30, even though the actuator 30 extends out from the periphery of the cushion portion 21. In an embodiment, the actuator 30 extends at least 10 mm outside of the periphery of the cushion portion 21, preferably a distance of from 10-100 mm, preferably 10-50 mm, more preferably 10-40 mm. The actuator 30 may comprise a grip surface having an area of at least 2 cm$^2$, preferably 2-20 cm$^2$, more preferably 2-10 cm$^2$. The visible portion of the actuator 30, i.e. visible outside of the head rest arrangement 20, may have a length of 10-100 mm, and optionally a thickness of from 0.2-9 mm, and optionally a width of 1-50 mm. A suitable material is rubber.

The actuator 30 may, as in the shown embodiment, comprise a rigid portion 31 (also shown in FIGS. 3a-3b). It should be noted that the actuator 30 can be made solely of the compliant material but it has been found that a rigid portion, such as the rigid portion 31, assist in operatively connecting the lock function to the actuator 30. The rigid portion 31 can be made of steel, rigid thermoplastic or composite material just to mention some. The material should be rigid enough to withstand wear imparted by a mechanical connection such as the latch 46. The rigid portion 31 of the actuator 30 should however be arranged inside of the head rest arrangement 20, at least within the outer periphery defined by the cushion portion. The rigid portion 31 of the actuator 30 may in an embodiment be arranged fully between the cushion portion 22 and the back rest portion 22 i.e. concealed therein.

FIG. 4a shows the latch 46 in a locked position and FIG. 4b shows the latch 46 in an unlocked position. As can be noticed, the u-shaped frame 41 comprises a plurality of notches 49, in this case only of which two are visible. The remaining notches are covered by the connection member 42. In the shown embodiment, the u-shaped frame 41 comprises four notches 49 adapted to cooperate with the latch 46 providing the cushion portion 21 with four defined positions. It should be noted that the u-shaped frame 41, and more generally the head rest arrangement 20, may be provided with substantially any number of defined available positions for the cushion portion 21 such as 2, 3, 4, 5, 6, 7, 8, 9 or more predefined positions. In the shown embodiment, such predefined positions would be equivalent with 2, 3, 4, 5, 6, 7, 8, 9 or more notches in the u-shaped frame 41.

When a user pulls the actuator 30 as indicated by the arrow B in FIG. 4a, the latch 46 pivots and disengages the cooperating notch. The user may then push the cushion part 21 in the desired direction, e.g. up or down. The actuator 30, which is displaced by a translatory motion when imparted by a pulling force, retracts the latch 46 from engagement. It is enough if the actuator 30 is displaced a distance of from 3-20 mm in the pulling direction, preferably 4-15 mm.

As can be seen in FIG. 4b, once the latch 46 has disengaged the cooperating notch, the latch is biased by means of the biasing member 47. Once the actuator 30 is released, the biasing member 47 biases the actuator 30 towards the position shown in FIG. 4a, i.e. towards engagement with one of the notches 49. If the latch 46 is misaligned with a notch, the latch will simply rest on the u-shaped frame 41 until the cushion portion 21 is displaced and the latch can engage a notch 49. Once the latch 46 is aligned with a notch, in this case representing the selected position by a user, the latch snaps into engagement with the notch and the position of the cushion portion 21 is locked. Each leg of the u-shaped frame 41 may be provided with a lock mechanism as disclosed herein. The actuator 30 could in such a case be operatively connected to two or more latches to lock the position of the cushion portion.

In an embodiment, a similar mechanism as disclosed herein may be provided to displace the cushion portion 21 left or right, instead of up or down i.e. in a vertical direction. The connection member 41 may for example be provided with a similar sliding frame as the u-shaped frame 41 on which the cushion portion 21 is positioned enabling the cushion portion 21 to be displaced along more than one axis.

Figure 5B:
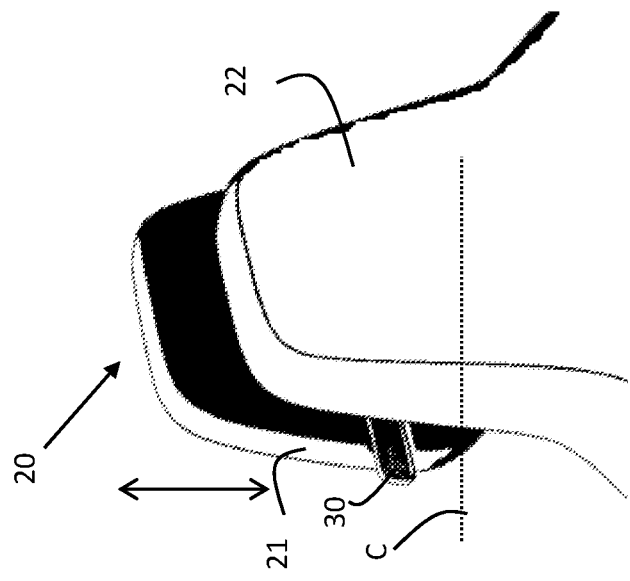
FIG. 5b shows the cushion portion in a raised position.
Figure 5A:
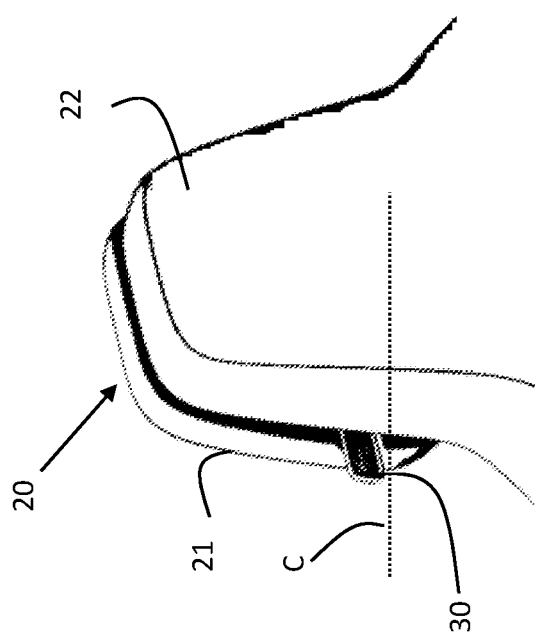
FIG. 5a shows the cushion portion in a lowered position.

FIG. 5a shows the head rest arrangement 20 before displacement of the cushion portion 21 and FIG. 5b after displacement. As is noticeable, as the actuator 30 is arranged to the displacement arrangement 40, the actuators 30 position with move synchronously with the cushion portion 21 as is indicated with the dashed reference line C. It is also noticeable that the actuator 30 protrudes from the outer periphery from a position between the cushion portion 21 and the back portion 22. As an option, the actuator 30 could protrude from a position within said cushion portion 21 if desirable. The actuator 30 is advantageously positioned in a groove so that the interface between the cushion portion 21 and the back rest portion 22 is smooth.

The invention claimed is:

1. A head rest arrangement for a vehicle seat comprising:
   a cushion portion and a back portion;
   a displacement arrangement enabling at least said cushion portion to be displaced between at least a first position and a second position with respect to said vehicle seat after being mounted thereto, wherein said displacement arrangement comprising:
   a lock mechanism adapted to lock said cushion portion in said first position and said second position, and
   an actuator operable by a user to unlock said lock mechanism, and said actuator is at least partly made from a compliant material, and actuated via a pulling force in a first direction, wherein said actuator is arranged to move synchronously with said cushion portion when said cushion portion is displaced.

2. The head rest arrangement according to claim 1, wherein said cushion portion and said back portion comprises an outer periphery, and wherein said actuator protrudes from the outer periphery of said cushion portion and/or said back portion in said first direction.

3. The head rest arrangement according to claim 2, wherein said actuator protrudes from said outer periphery from a position between said cushion portion and said back portion, or from a position within said cushion portion.

4. The head rest arrangement according to claim 1, wherein said cushion portion is displaceable in at least a vertical direction (Z) and/or a horizontal direction (Y) after said lock mechanism has been unlocked via said actuator.

5. The head rest arrangement according to claim 1, wherein said first direction is substantially perpendicular to a vertical direction (Z) after said head rest arrangement is mounted to said vehicle seat.

6. The head rest arrangement according to claim 1, wherein said compliant material is made from one or more of natural rubber, synthetic rubber, natural fibers, synthetic fibers, woven fabric, non-woven fabric, or thermoplastic polymers.

7. The head rest arrangement according to claim 1, wherein said back portion of said head rest arrangement is integrally formed with a portion of a back rest.

8. The head rest arrangement according to claim 1, wherein said actuator further comprises a rigid portion being arranged inside of said head rest arrangement.

9. The head rest arrangement according to claim 8, wherein said actuator is connected to a latch adapted to lock said cushion portion in position.

10. The head rest arrangement according to claim 9, wherein said rigid portion is connected to said latch.

11. The head rest arrangement according to claim 1, wherein said actuator is displaced by a translatory motion in said first direction when imparted by said pulling force.

12. The head rest arrangement according to claim 1, wherein said actuator is elastically extended when imparted by said pulling force.

13. The head rest arrangement according to claim 1, wherein said actuator is biased by a biasing member in a direction opposite to said first direction.

14. The head rest arrangement according to claim 1, wherein said actuator comprises a grip surface having an area of at least one of 2 $cm^2$, 2-20 $cm^2$, or 2-10 $cm^2$.

15. The head rest arrangement according to claim 1, wherein said vehicle seat is a front vehicle seat or a rear vehicle seat.

* * * * *